United States Patent
Minter

(10) Patent No.: US 6,827,837 B2
(45) Date of Patent: Dec. 7, 2004

(54) METHOD FOR RECOVERING TRACE ELEMENTS FROM COAL

(75) Inventor: Bruce E. Minter, Eagle, ID (US)

(73) Assignee: Robert W. Halliday, Boise, ID (US)

( * ) Notice: Subject to any disclaimer, the term of this patent is extended or adjusted under 35 U.S.C. 154(b) by 56 days.

(21) Appl. No.: 10/302,632

(22) Filed: Nov. 22, 2002

(65) Prior Publication Data

US 2004/0099095 A1 May 27, 2004

(51) Int. Cl.$^7$ .............................................. C25C 1/20
(52) U.S. Cl. ........................ 205/565; 75/421; 75/422; 75/423; 75/631; 75/632; 75/633; 75/634
(58) Field of Search ........................ 75/421, 422, 423, 75/631, 632, 633, 634; 205/565

(56) References Cited

U.S. PATENT DOCUMENTS

| | | | |
|---|---|---|---|
| 4,224,058 A | 9/1980 | Wilson et al. ................. | 75/58 |
| 4,229,270 A | 10/1980 | Subramanian et al. ...... | 204/109 |
| 4,295,880 A | 10/1981 | Horner, Jr. ..................... | 75/10 |
| 4,337,226 A | 6/1982 | Peasley et al. ................ | 423/22 |
| 4,390,366 A | 6/1983 | Lea et al. ............... | 75/101 BE |
| 4,462,879 A | 7/1984 | Castellanos et al. ........ | 204/140 |
| 4,857,107 A * | 8/1989 | Davis .......................... | 75/331 |
| 4,863,489 A | 9/1989 | Suggitt ........................ | 48/197 |
| 5,215,575 A | 6/1993 | Butler .......................... | 75/744 |
| 5,290,339 A | 3/1994 | Gallup et al. ................. | 75/712 |
| 5,401,296 A | 3/1995 | Martenson et al. ........... | 75/741 |
| 5,620,585 A * | 4/1997 | Dadgar et al. ............... | 205/565 |
| 5,753,004 A | 5/1998 | Hanai et al. ................ | 75/10.14 |
| 5,787,823 A | 8/1998 | Knowles ..................... | 110/344 |
| 6,126,720 A | 10/2000 | Okada et al. ................. | 75/714 |
| 6,221,123 B1 | 4/2001 | Mann, Sr. .................. | 75/10.14 |
| 6,461,400 B1 * | 10/2002 | Parker ....................... | 75/10.14 |

OTHER PUBLICATIONS

U.S. coal quality (CoalQual)Database v2.0, Nov. 22, 2002.

* cited by examiner

Primary Examiner—Melvyn Andrews
(74) Attorney, Agent, or Firm—Joseph W. Holland

(57) ABSTRACT

The present invention is directed to a method for the recovery of one or more trace elements including gold and one or more platinum group elements from coal. More particularly, the present invention may specify parameters for the selection of coal for combustion, the parameters for combustion of the pre-selected coal, the parameters for the preparation and mixing of a charge for a furnace including ash from the combustion of the coal with an inquart and a fluxing agent, the parameters for the heating of the charge and casting of a dore bar and the parameters for the production of an anode slime from the dore bar. The method of the present invention may also specify parameters for the recovery of silver, gold and one or more trace platinum group elements from the anode slimes.

22 Claims, 5 Drawing Sheets

METHOD FOR RECOVERING TRACE ELEMENTS FROM COAL

BACKGROUND OF THE INVENTION

1. Field of Invention

This invention relates to a method for the recovery of one or more trace elements from coal and more particularly to a method for the recovery of one or more trace elements, including gold and the platinum group elements, from coal and coal ash.

2. Background of the Invention

Coal is a solid heterogeneous composition including a mixture of pure hydrocarbons, oxygenated hydrocarbons and complex hydrocarbons including other elements, inorganic minerals and water. Differing geologic histories have resulted in the formation of coals with differing chemical properties.

The chemical properties of coal, are dependant largely on geologic origin and the conditions observed during formation of any given coal deposit. Additionally, the chemical properties of coal ash may be dependant on the parameters observed during combustion. The combustion of coal produces bottom ash and a combustion gas composed typically of nitrogen, carbon dioxide, water vapor, oxygen, and smaller amounts of inorganic elements and compounds, commonly in vapor state, and flyash.

In the combustion of coals, for instance in many power generating facilities, flyash accompanies combustion gas from the furnace through the flue combustion gas treatment and may be removed in baghouses or by precipitation. While flyash may include any naturally occurring element, aluminosilicate and calcium compounds typically account for more than 80% of the mass. Flyash commonly includes oxygenated inorganic compounds including silica, aluminum, calcium, magnesium, iron, sodium, potassium, titanium and sulfur as well as trace elements including mercury, silver, gold and various platinum group elements. As used herein, the term platinum group elements may include platinum, palladium, rhodium, ruthenium, osmium, and iridium. Ash may also accumulate in the bottom of the furnace as a loose, dry bottom ash or as a slag. Coal bottom ash tends to be a granular, porous material. Compared to fly ash, bottom ash is typically more coarse. Slag is typically formed as black glassy particles.

Considerable attention has been afforded the problems relating to removal of selected trace elements from flue gas, particularly sulfur and mercury. Additionally, at least one method has been developed for separating gold and platinum group elements from chloride containing solutions. U.S. Pat. No. 4,390,366 to Lea, et al., entitled *Process for the Extraction of Precious Metals from Solutions Thereof*, discloses a solvent extraction process for sequentially and selectively separating and removing gold and platinum group metal values from a chloride containing aqueous solution.

It may be desirable to provide a method for the recovery of one or more trace elements including gold and one or more platinum group elements from coal. More particularly, it may be desirable to provide a method which specifies parameters for the selection of coal, parameters for combustion of the pre-selected coal and the parameters for a process for recovering gold and one or more platinum group elements from the ash produced by the combustion of the identified coal.

Additionally, it may be desirable to provide a method for the recovery of one or more trace elements including gold and one or more platinum group elements from coal ash. More particularly, it may be desirable to provide a method which specifies parameters for the selection of coal ash and the parameters for a method for recovering silver, gold and one or more platinum group elements from the coal ash.

Therefore, it is one objective of the present invention to provide a method for the recovery of one or more trace elements including gold and one or more trace platinum group elements from coal and/or coal ash. More particularly, it is an objective of the present invention to provide a method which may specify parameters for the selection of coal and parameters for combustion of the selected coal, or in the alternative, the parameters for the selection of a coal ash, as well as the parameters for the recovery of gold and one or more trace platinum group elements from the ash produced by the combustion of coal and/or coal ash.

SUMMARY OF THE INVENTION

The present invention is directed to a method for the recovery of one or more trace elements including gold and one or more platinum group elements from coal. As used herein the term coal may include both coal and lignite. The present invention is also directed to a method for the preparation of a dore bar including gold and one or more platinum group elements. Additionally, the present invention is directed to a method for the preparation of an anode slime including gold and one or more platinum group elements. The present invention specifies parameters for the preparation and mixing of a charge for a furnace including ash from the combustion of a selected coal, an inquart and a fluxing agent, the parameters for the heating of the charge and the casting of a dore bar. The present invention may also specify parameters for the preparation of an anode slime including gold and one or more trace platinum group elements from the ash produced by the combustion of the pre-selected coal. Additionally, the present invention may also specify one or more parameters for the identification and selection of coal including gold and one or more platinum group elements, one or more parameters for the combustion of a pre-selected coal producing an ash for mixing to form a charge, the ash including gold and one or more platinum group elements.

According to one embodiment, the method for the recovery of one or more trace elements from coal includes the steps of mixing a charge including an ash formed by the combustion of a pre-selected coal, the ash including gold and one or more platinum group elements, an inquart including gold and one or more platinum group elements and a fluxing agent, charging the furnace with the charge, heating the charge in the furnace to a pre-selected temperature forming a molten charge including a molten inquart, absorbing a portion of the gold and one or more platinum group elements of the ash into the molten inquart, discharging a molten slag from the furnace and casting a dore bar by discharging the molten inquart including an absorbed portion of the gold and one or more platinum group elements of the ash to a mold.

An alternate preferred embodiment of the invention also includes the additional steps of digesting the dore bar in an electrowinning process wherein the dore bar is introduced into an acidic bath as an anode and an electrical potential is maintained between the dore bar and a cathode plate, reducing silver ions onto the cathode plate and precipitating and dissolving trace elements in the electrolytic solution producing an anode slime.

An alternate preferred embodiment of the invention also includes the additional steps of recovering gold and one or more platinum group elements from the anode slimes by any of a variety of means. One such method calls for the digestion of the anode slimes using a 30% solution of $HNO_3$. The digested solution is filtered and rinsed. The liquid rinse portion contains silver in solution and may be washed with HCl and filtered. The residue of the filtration of the digested slimes is mixed with aqua regia forming a solution containing gold, platinum and palladium. Gold may be removed by solvent extraction, or in the alternative gold may be removed by treatment with iron chloride, ($FeCl_2$). Rhodium and other trace elements may be removed by precipitation by treatment of the solution with potassium hydroxide and sodium borohydride. Palladium in solution may be removed by any of a variety of known methods including precipitation by treatment with ammonium hydroxide, $NH_4OH$, and HCl as the complex $PdCl_2(NH_3)_2$. This yields palladium metal by burning. Alternately, palladium in solution may be removed by precipitation with DiMethyl Glyoxime, followed by filtration and reduction and burning or ashing of the residue. Platinum in solution may be removed by any of a variety of known methods including precipitation as impure $(NH_4)_2PtCl_6$ on treatment with $NH_4Cl$, leaving $H_2PdCl_4$ in solution. In the event that an organic solvent such as DiMethyl Glyoxime is employed to extract gold, and, prior to treatment with $NH_4Cl$, the solution should be treated with ethanol and hydrogen peroxide. The solution may be filtered and the residue, including $(NH_4)_2PtCl_6$, subjected to reduction and burning leaving an impure platinum sponge. The platinum sponge may be purified by redissolving in aqua regia. Alternately, platinum may be recovered by precipitation of pure $(NH_4)_2PtCl_6$ by treatment with ammonium hydroxide, $NH_4OH$. This yields platinum metal by burning.

The preferred embodiment of the invention includes the additional steps of pre-selecting a coal for combustion including gold and one or more platinum group elements for combustion and combusting the pre-selected coal including gold and one or more platinum group elements producing an ash including gold and one or more platinum group elements. To date it has been demonstrated that, the Blackhawk formation located in the state of Utah, the Powder River coal field located in Wyoming, and the Yegua and Manning formations, produce coal that, when combusted produce an ash including acceptable levels of gold and one or more platinum group elements recoverable by the method of the present invention.

Additionally, it is believed that coals may be identified by chemical composition which, upon combustion may produce an ash having levels of gold and one or more trace platinum group elements which may be of sufficient concentrations and present in a form recoverable by the method of the present invention, such as to justify the costs of extraction. More particularly, it has been observed that coals that include a bromine concentration of less than or equal to 1.00 ppm, exhibit a tendency to release or otherwise permit the absorption of gold and platinum group elements by a molten inquart of a molten charge, thereby rendering the gold and platinum group elements more readily recoverable than these elements appear to be in coals having higher concentrations of bromine. Alternately, it has been observed that coals that include a bromine concentration of less than or equal to 76.00 ppm and which exhibit concentrations of chlorine, aluminum and one or more transition elements that are within specified ranges may produce an ash having levels of gold and one or more trace platinum group elements which may be of sufficient concentrations and present in a form recoverable by the method of the present invention, in quantities such as to justify the costs of extraction.

Without being bound by theory, it is believed that due to the relatively lower concentrations of bromine, chlorine, aluminum and one or more transition elements in identifiable coals, including Blackhawk coal, Powder River coal and Texas lignite, a lower frequency or concentration of compounds including coordination compounds, chelates and/or complexes are formed in the coal and or the ash produced by the combustion of such coals, which may tie up or bind trace gold and platinum group elements. Hence, it is believed that in identifiable coals, including coals extracted from the Blackhawk formation, the Powder River coal field and lignite coals from the Yegua and Manning lignite formations found in Texas, include levels of gold and one or more trace platinum group elements which are of sufficient concentrations and present in a form recoverable by the method of the present invention, in quantities such as to justify the costs of extraction.

Additionally, and without being bound by theory, it is believed that the combustion of other coals from other formations may be identified by empirical, analytical or statistical means, which may result in the production of a flyash containing gold and one or more trace platinum group elements that are recovered by the method of the present invention. It is the intention that the scope of the present invention specifically include both the extraction of trace gold and platinum group elements from ash produced by the combustion of Blackhawk coal as well as from ash produced by the combustion of coal from other formations that may be identified by such means and which result in the production of a flyash containing concentrations of gold and one or more trace platinum group elements which are of sufficient concentrations and present in a form recoverable by the method of the present invention, in quantities such as to justify the costs of extraction.

The present invention consists of the method and system hereinafter more fully described, illustrated in the accompanying drawings and more particularly pointed out in the appended claims, it being understood that changes may be made in the form, size, scale, proportions and other details of construction without departing from the spirit or sacrificing any of the advantages of the invention.

DESCRIPTION OF THE PREFERRED EMBODIMENT

Referring to FIGS. 1 through 5, a method for recovery of one or more trace elements from coal will be more fully described.

Figure 1:
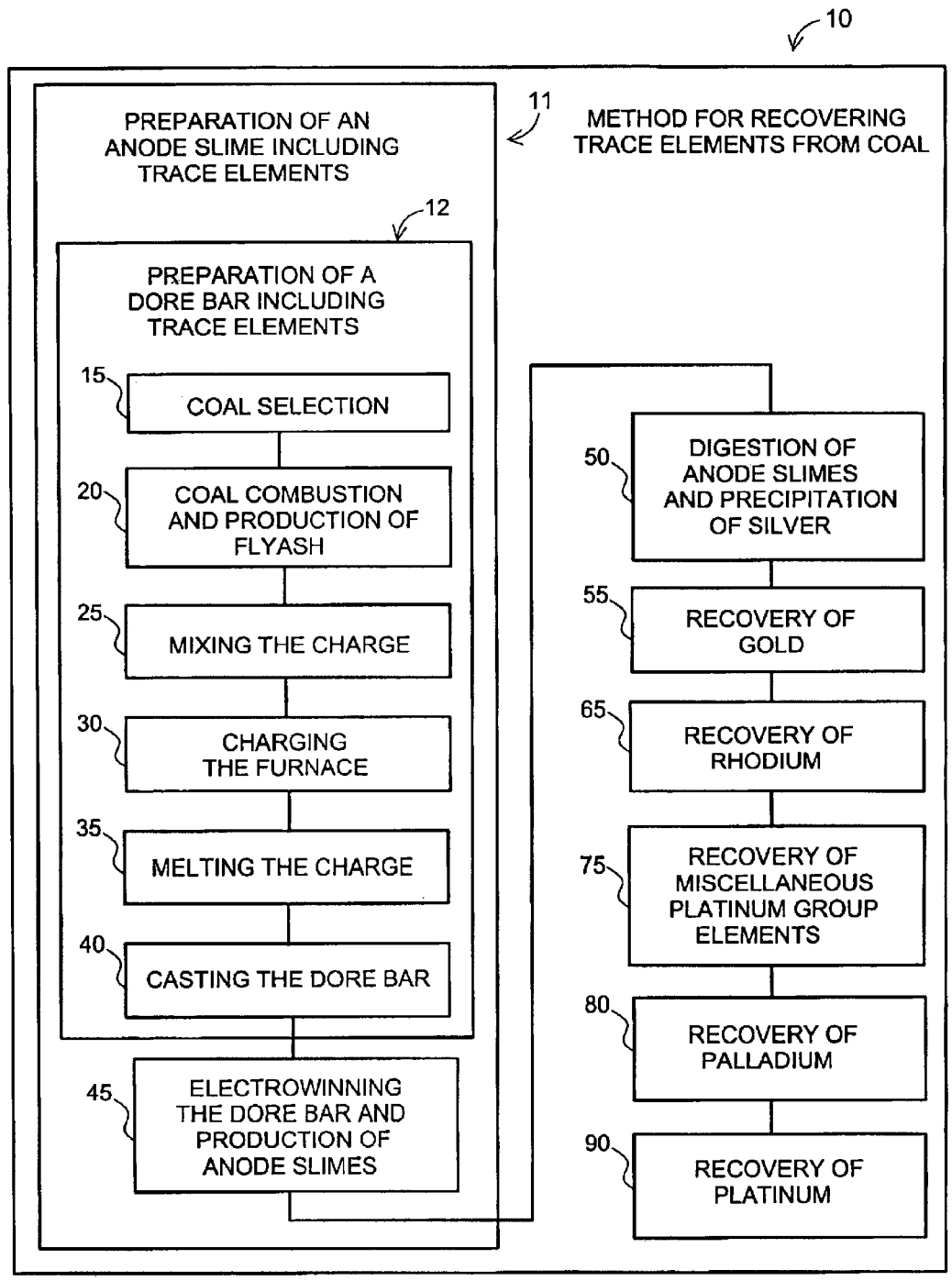
FIG. 1 is a representative flow chart depicting the steps of a method for recovery of one or more trace elements from coal according to one embodiment of the invention.

Referring to FIG. 1, a METHOD FOR RECOVERING TRACE ELEMENTS FROM COAL 10 includes PREPARATION OF A DORE BAR INCLUDING TRACE ELEMENTS 12 and PREPARATION OF AN ANODE SLIME INCLUDING TRACE ELEMENTS 11.

PREPARATION OF A DORE BAR INCLUDING TRACE ELEMENTS 12 may include COAL SELECTION 15, COAL COMBUSTION AND PRODUCTION OF FLYASH 20, MIXING THE CHARGE 25, CHARGING THE FURNACE 30, MELTING THE CHARGE 35 and CASTING THE DORE BAR 40. PREPARATION OF AN ANODE SLIME INCLUDING TRACE ELEMENTS 11 includes the steps of PREPARATION OF A DORE BAR INCLUDING TRACE ELEMENTS 12 as well as the additional step of ELECTROWINNING THE DORE BAR AND PRODUCTION OF ANODE SLIMES 45.

In the embodiment of the invention shown in FIG. 1, the METHOD FOR RECOVERING TRACE ELEMENTS FROM COAL 10 also includes DIGESTION OF ANODE SLIMES AND PRECIPITATION OF SILVER 50, RECOVERY OF GOLD 55, RECOVERY OF RHODIUM 65, RECOVERY OF MISCELLANEOUS PLATINUM GROUP ELEMENTS 75, RECOVERY OF PALLADIUM 80 and RECOVERY OF PLATINUM 90.

At the step COAL SELECTION 15, a coal that includes gold and one or more platinum group elements, is preselected for combustion. In one preferred embodiment of the invention, coal for combustion is identified by geologic origin, coal formation or coal field. Coal from the Blackhawk formation located in south-central Utah, (herein "Blackhawk coal"), the Powder River coal field located in Wyoming, (herein "Powder River coal"), and lignite from the Yegua and Manning formations, (herein "Texas lignite"), have been identified to date as producing flyash having a platinum concentration of greater than 0.00 ppm., (parts per million), and acceptable levels of trace elements including gold and one or more trace platinum group elements recoverable employing the methods of the present invention.

Comparing data located at the US Coal Quality (COALQUAL) Database v2.0, analyzing ash produced by the combustion of coals, including the database web interface, http://www.usgs.gov, enabled by National Coal Resources Data System, (herein "the data"), and more particularly, in comparing coals for the states of Kentucky, Pennsylvania, Tennessee and West Virginia, as representative of eastern coals, (herein "eastern states coal"), to Blackhawk coal, it has been observed that for coals including a total concentration of gold and platinum group elements greater than 0, for the eastern states coal, bromine concentrations may be as high as 160 ppm, with the data indicating an average level of bromine approximately equal to 24 ppm. Conversely, the data indicates that Blackhawk coal that includes a total concentration of gold and platinum group elements greater than 0, also includes a bromine concentration in the range of 0.20 to 0.80 ppm with an average bromine concentration approximately equal to 0.30 ppm. The data indicates that for Powder River coal including a total concentration of gold and platinum group elements greater than 0, bromine concentration in the range of 0.20 to 0.65 ppm and an average bromine concentration approximately equal to 0.30 ppm may be observed. Additionally, the data shows that for Texas lignite, including a total concentration of gold and platinum group elements greater than 0, a bromine concentration of 0.00 ppm has been observed. Notably, bromine concentrations found in the ash produced by the combustion of eastern coal averages approximately 85 times that of the ash produced by the combustion of either Blackhawk coal, 11 times that of the ash produced by the combustion of Powder River coal and is incalculable as compared to ash produced by the combustion of Texas lignite. Accordingly, in one preferred embodiment of the invention, ash produced from the combustion of a coal will exhibit a concentration of bromine in the range of 0.00 to 0.80 ppm, or in the alternative an average bromine concentration substantially equal to 0.30 ppm, or in the alternative a maximum bromine concentration less than or equal to 1.00 ppm. In calculating average concentrations the high and low data points were discarded and an average of the remaining samples was taken.

Similarly, in reviewing the data for the analysis of ash produced by the combustion of coals for the eastern states coals that include a total concentration of gold and platinum group elements greater than 0, it has been observed that chlorine levels may be as high as 8,800 ppm, with the same set of samplings having an average level of chlorine approximately equal to 680 ppm. Conversely, it has been observed in the data for samplings of ash produced by the combustion of Blackhawk coal that include a total concentration of gold and platinum group elements greater than 0, that the ash of these coals includes a chlorine concentration in the range of 50 to 130 ppm and an average chlorine concentration approximately equal to 77 ppm. Similarly, it has been observed in the data for samplings of ash produced by the combustion of Powder River coal that include a total concentration of gold and platinum group elements greater than 0, that the ash of these coals includes a chlorine concentration in the range of 70 to 100 ppm and an average chlorine concentration approximately equal to 72 ppm. Additionally, it has been observed in the data for samplings of ash produced by the combustion of Texas lignite, including a total concentration of gold and platinum group elements greater than 0, that the ash of these coals includes a chlorine concentration in the range of 100 to 200 ppm and an average chlorine concentration approximately equal to 150 ppm. Chlorine concentrations found in the ash produced by the combustion of eastern coal averages approximately 6.5 times that of the ash produced by the combustion of Blackhawk coal and approximately 7 times that of the ash produced by the combustion of Powder River coal and 3 times that of the ash produced by the combustion of Texas lignite. Accordingly, in an alternate preferred embodiment of the invention, ash produced from the combustion of a coal may exhibit a concentration of chlorine in the range of 50 to 200 ppm, or in the alternative an average chlorine concentration substantially equal to 100 ppm, or in the alternative a maximum chlorine concentration less than 200 ppm.

Additionally, it has been observed in comparing the data for samplings of ash produced by the combustion of coals for the eastern states coals with one set of samplings of ash produced by the combustion of Blackhawk coal, Power River coal and Texas lignite including a total concentration of gold and platinum group elements greater than 0, that eastern states coals typically produce ash having a substantially higher concentration of the representative element aluminum. Ash produced from the combustion of eastern states coals includes an average concentration approximately 4.5 times greater than ash produced by the combustion of Blackhawk coal, approximately 9 times greater than ash produced by the combustion of Powder River coal and approximately 2 times greater than ash produced by the combustion of Texas lignite. Blackhawk coal, including a total concentration of gold and platinum group elements greater than 0, includes a concentration of aluminum in the range of 1,700–26,000 ppm, with an average concentration of aluminum approximately equal to 8,800 ppm. Ash produced from the combustion of Powder River coal, including a total concentration of gold and platinum group elements greater than 0, includes a concentration of aluminum in the range of 1,500–32,000 ppm, with an average concentration of approximately 4,700 ppm. Ash produced from the combustion of Texas lignite, including a total concentration of gold and platinum group elements greater than 0, includes a concentration of aluminum in the range of 15,000–25,000 ppm, with an average concentration of approximately 22,000 ppm. Accordingly, in an alternate preferred embodiment of the invention, ash produced from the combustion of a coal may exhibit a concentration of aluminum in the range of 1,000–32,000 ppm, or in the alternative an average aluminum concentration in the range of 4,500 to 9,000 ppm, or in the alternative a maximum aluminum concentration less than 32,000 ppm.

Additionally, in comparing the data for the analysis of ash produced by the combustion of coals for the eastern states coals with the data for the analysis of ash produced by the combustion of Blackhawk coal, Power River coal and Texas lignite that include a total concentration of gold and platinum group elements greater than 0, it has been observed that eastern states coals typically produce ash having higher concentrations of the following transition elements:

Chromium. Ash produced from the combustion of eastern states coals include an average concentration of chromium approximately 2 times greater than ash produced from the combustion of Blackhawk coal which includes a concentration in the range of approximately 1–30 ppm, with an average concentration of approximately 7.50 ppm. Ash produced from the combustion of eastern states coals include an average concentration approximately 1.75 times greater than ash produced from the combustion of Powder River coal which includes a concentration of chromium in the range of 2.5–25 ppm, with an average concentration of chromium substantially equal to 10 ppm. Ash produced from the combustion of eastern states coals include an average concentration approximately 1.5 times greater than ash produced from the combustion of Texas lignite which includes a concentration of chromium in the range of 7.5–10 ppm, with an average concentration of chromium substantially equal to 9.5 ppm. Accordingly, in an alternate preferred embodiment of the invention, ash produced from the combustion of a coal may exhibit a concentration of chromium in the range of 1–30 ppm, or in the alternative an average chromium concentration in the range of 7.5–10 ppm, or in the alternative a maximum chromium concentration less than or equal to 30 ppm.

Iron. Ash produced from the combustion of eastern states coals include an average concentration of iron approximately 7 times greater than ash produced from the combustion of Blackhawk coal which includes a concentration in the range of 250–6,000 ppm, with an average concentration of iron approximately 1,675 ppm. Ash produced from the combustion of eastern states coals include an average concentration of iron approximately 5 times greater than ash produced from the combustion of Powder River coal field which includes a concentration of iron in the range of 375–11,000 ppm, with an average concentration of iron substantially equal to 2,325 ppm. Ash produced from the combustion of eastern states coals include an average concentration of iron approximately 1.5 times greater than ash produced from the combustion of Texas lignite which includes a concentration of iron in the range of 4,500–10,000 ppm, with an average concentration of iron substantially equal to 8,100 ppm. Accordingly, in an alternate preferred embodiment of the invention, ash produced from the combustion of a coal may exhibit a concentration of iron in the range of 250–11,000 ppm, or in the alternative an average iron concentration in the range of 1,600–8,100 ppm, or in the alternative a maximum iron concentration less than or equal to 11,000 ppm.

Cobalt. Ash produced from the combustion of eastern states coals include an average concentration of cobalt approximately 5 times greater than ash produced from the combustion of Blackhawk coal which includes a concentration of cobalt in the range of 0.50–8.00 ppm, with an average concentration of cobalt approximately equal to 1.35 ppm. Ash produced from the combustion of eastern states coals include an average concentration of cobalt approximately 4 times greater than ash produced from the combustion of Powder River coal which includes a concentration of cobalt in the range of 0.30–9.00 ppm, with an average concentration of cobalt substantially equal to 1.75 ppm. Ash produced from the combustion of eastern states coals include an average concentration of cobalt approximately 4 times greater than ash produced from the combustion of Texas lignite which includes a concentration of cobalt in the range of 1.10–2.10 ppm, with an average concentration of cobalt substantially equal to 1.65 ppm. Accordingly, in an alternate preferred embodiment of the invention, ash produced from the combustion of a coal may exhibit a concentration of cobalt in the range of 0.30–9.00 ppm, or in the alternative an average cobalt concentration in the range of 1.35–1.75 ppm, or in the alternative a maximum cobalt concentration less than or equal to 9.00 ppm.

Nickel. Ash produced from the combustion of eastern states coals include an average concentration approximately 3 times greater than ash produced from the combustion of Blackhawk coal which includes a concentration of nickel in the range of 0.50–10 ppm, with an average concentration of approximately 4.80 ppm. Ash produced from the combustion of eastern states coals include an average concentration of nickel approximately 3 times greater than ash produced from the combustion of Powder River coal which includes a concentration of nickel in the range of 1.30–40 ppm, with an average concentration of nickel substantially equal to 1.75 ppm. Ash produced from the combustion of eastern states coals include an average concentration of nickel approximately 2 times greater than ash produced from the combustion of Texas lignite which includes a concentration of nickel in the range of 4.50–10 ppm, with an average concentration of nickel substantially equal to 1.75 ppm. Accordingly, in an alternate preferred embodiment of the invention, ash produced from the combustion of a coal may exhibit a concentration of nickel in the range of 0.50–40 ppm or in the alternative an average nickel concentration in the range of 1.75–5 ppm, or in the alternative a maximum nickel concentration less than or equal to 40 ppm.

Molybdenum. Ash produced from the combustion of eastern states coals include an average concentration approximately 4 times greater than ash produced from the combustion of Blackhawk coal which includes a concentration of molybdenum in the range of 0.10–1.50 ppm, with an average concentration of approximately 0.60 ppm. Ash produced from the combustion of eastern states coals include an average concentration of molybdenum approximately 4 times greater than ash produced from the combustion of Powder River coal which includes a concentration of molybdenum in the range of 0.11–4.5 ppm, with an average concentration of molybdenum substantially equal to 0.58 ppm. Ash produced from the combustion of eastern states coals include an average concentration of molybdenum approximately 1.1 times greater than ash produced from the combustion of Texas lignite which includes a concentration of molybdenum in the range of 0.27–3.4 ppm, with an average concentration of molybdenum substantially equal to 2.30 ppm. Accordingly, in an alternate preferred embodiment of the invention, ash produced from the combustion of a coal may exhibit a concentration of molybdenum in the range of 0.10–4.50 ppm or in the alternative an average molybdenum concentration substantially equal to 0.60 ppm, or in the alternative a maximum molybdenum concentration less than or equal to 4.5 ppm.

Referring to FIG. 1, once a coal is selected at COAL SELECTION 15, the process continues with COAL COMBUSTION AND PRODUCTION OF FLYASH 20. Flyash is produced including gold and one or more platinum group elements from the combustion of the pre-selected coal in a combustion zone. Flyash may be analyzed following combustion to verify the specified levels gold and one or more platinum group elements, as well as levels of other elements. Care must be taken during the combustion of the coal not to over-roast the coal in the furnace. As used herein the term "over-roasting" implies continuing with combustion following attainment of a maximum BTU output level, or attainment of substantially a maximum BTU output level. In one embodiment of the invention, flyash is produced in a combustion zone wherein coal is subjected to a temperature in the range of 1,500 deg. C., (2,732 deg. F.), to 1,950 deg. C., (3,542 deg. F.). Preferably, flyash is withdrawn from the combustion zone once a maximum BTU output level for the coal is achieved. In one embodiment of the invention, flyash is removed from the combustion zone when a maximum BTU output of 11,000 BTU/lb to 13,000 BTU/lb is achieved. It is believed that allowing the flyash to remain in the combustion zone once a maximum BTU has been achieved or re-circulating the flyash through the combustion zone once a maximum BTU has been achieved lowers concentrations of recoverable gold and platinum group elements in the flyash.

Figure 2:
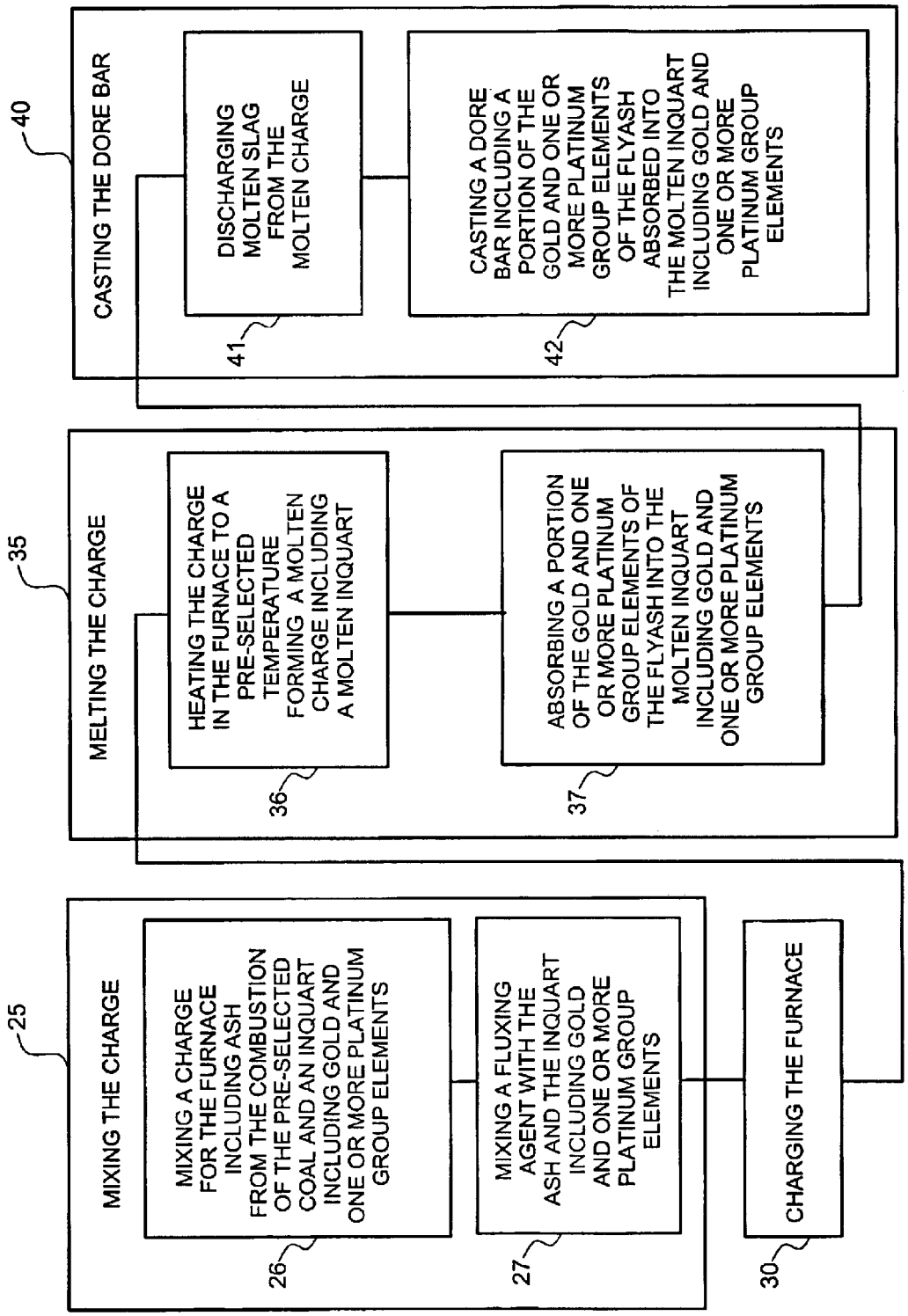
FIG. 2 is a representative flow chart depicting several steps of a method for recovery of one or more trace elements from coal according to one embodiment of the invention.

Referring to FIG. 2, the step MIXING THE CHARGE 25 includes MIXING A CHARGE FOR THE FURNACE INCLUDING ASH FORMED BY COMBUSTION OF THE PRE-SELECTED COAL AND AN INQUART INCLUDING GOLD AND ONE OR MORE PLATINUM GROUP ELEMENTS 26. In the preferred embodiment of the invention, flyash from the combustion of the pre-selected coal is mixed with an inquart including gold and one or more platinum group elements, together with a fluxing agent. In the preferred embodiment of the invention, a charge for a furnace is formed mixing flyash with an inquart including gold and one or more platinum group elements. In one preferred embodiment of the invention, flyash is mixed with an inquart including silver, gold, platinum and palladium to form the charge for the subsequent heating step. In this embodiment of the invention, an inquart including silver is mixed with flyash in a ratio in the range of 2:1 to 0.75:1, (ash:silver), or more preferably, flyash is mixed with an inquart including silver in a ratio substantially equal to 1:1, (ash:silver). An inquart of gold may also be mixed with flyash in a ratio in the range of 80:1 to 50:1, (ash:gold), or more preferably, in a ratio substantially equal to 65:1, (ash:gold). An inquart of platinum may also be mixed with flyash in a ratio in the range of 160:1 to 100:1, (ash:platinum), or more preferably, in a ratio substantially equal to 130:1, (ash: platinum). An inquart of palladium may also be mixed with flyash in a ratio in the range of 80:1 to 50:1, (ash:palladium), or more preferably, in a ratio substantially equal to 65:1, (ash:palladium).

In the preferred embodiment of the invention, the charge also includes a fluxing agent or fluxing agents mixed with the ash. At MIXING A FLUXING AGENT WITH THE ASH AND THE INQUART INCLUDING GOLD AND ONE OR MORE PLATINUM GROUP ELEMENTS 27 fluxing agents are added to and mixed with the charge. Fluxing may include borax glass, ($Na_2B_4O_7$), soda ash, ($Na_2CO_3$) calcium fluoride, ($CaF_2$), silica, ($SiO_2$), potassium nitrate, ($KNO_3$) and flour.

In one preferred embodiment of the invention, borax glass may be mixed with flyash in a ratio in the range of 0.20:1 to 0.50:1, (ash:borax glass), or more preferably, in a ratio substantially equal to 0.30:1, (ash:borax glass).

Soda ash may be mixed with flyash in a ratio in the range of 0.50:1 to 0.70:1, (ash:soda ash), or more preferably, in a ratio substantially equal to 0.60:1, (ash:soda ash).

Calcium fluoride, or fluorspar, may be mixed with flyash in a ratio in the range of 8:1 to 12:1, (ash:fluorspar), or more preferably, in a ratio substantially equal to 10:1, (ash:silica).

Silica may be mixed with flyash in a ratio in the range of 1.25:1 to 1.75:1, (ash:silica), or more preferably, in a ratio substantially equal to 1.50:1, (ash:silica).

Potassium nitrate, niter, may be mixed with flyash in a ratio in the range of 30:1 to 50:1, (ash:niter), or more preferably, in a ratio substantially equal to 40:1, (ash:niter).

Flour may be mixed with flyash in a ratio in the range of 50:1 to 10:1, (ash:flour), or more preferably, in a ratio substantially equal to 20:1, (ash:flour).

FIG. 2 also shows the step CHARGING THE FURNACE 30 wherein the mixed charge is placed in the furnace for the melting operation.

FIG. 2 also shows the steps of MELTING THE CHARGE 35 HEATING THE CHARGE IN THE FURNACE TO PRE-SELECTED TEMPERATURE FORMING A MOLTEN CHARGE INCLUDING A MOLTEN INQUART 36. At HEATING THE CHARGE IN THE FURNACE TO PRE-SELECTED TEMPERATURE FORMING A MOLTEN CHARGE INCLUDING A MOLTEN INQUART 36 the charge is brought to a pre-selected temperature, preferably in the range of 1,010 deg. C., (1,850 deg. F.), to 1,482 deg. C., (2,700 deg. F.). Preferably, the furnace is of an induction current type which facilitates mixing of the melt. Average furnace time is in the range of 2.0 hours to 4.0 hours. Once the charge reaches the molten stage, the step of ABSORBING A PORTION OF THE GOLD AND ONE OR MORE PLATINUM GROUP ELEMENTS OF THE FLYASH INTO THE MOLTEN INQUART INCLUDING GOLD AND ONE OR MORE PLATINUM GROUP ELEMENTS 37 occurs.

FIG. 2 shows the step CASTING THE DORE BAR 40. Following a holding or soak period, molten slag is discharged to a first mold at DISCHARGING THE MOLTEN SLAG FROM THE MOLTEN CHARGE 41. Next, a dore bar may be cast at CASTING A DORE BAR INCLUDING A PORTION OF THE GOLD AND ONE OR MORE PLATINUM GROUP ELEMENTS OF THE FLYASH ABSORBED INTO THE MOLTEN INQUART INCLUDING GOLD AND ONE OR MORE PLATINUM GROUP ELEMENTS 42.

Figure 3:
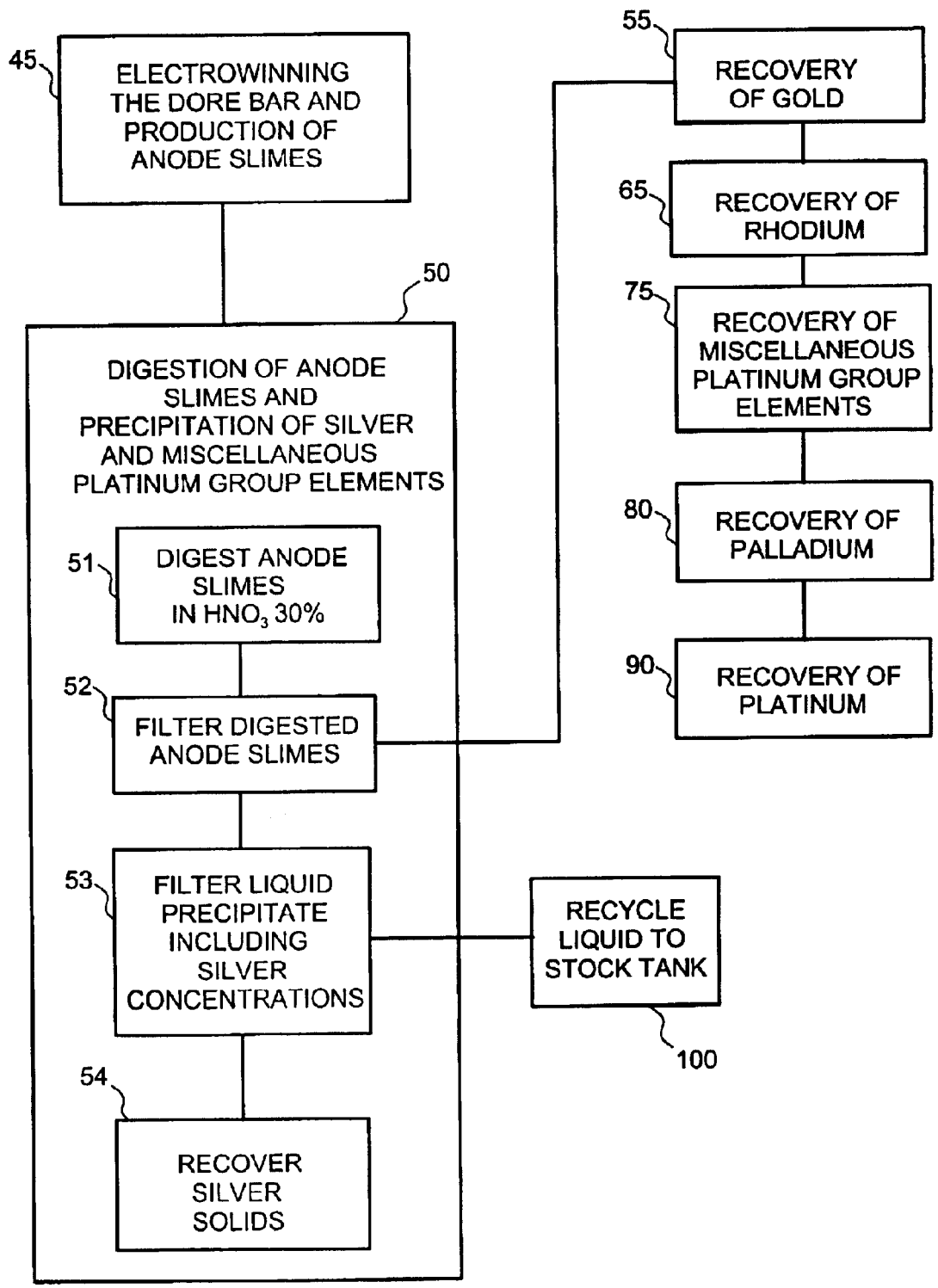
FIG. 3 is a representative flow chart depicting several steps of a method for recovery of one or more trace elements from coal according to one embodiment of the invention.

Referring to FIG. 3, at ELECTROWINNING THE DORE BAR AND PRODUCTION OF ANODE SLIMES 45 the dore bar is prepared for an electrowinning process first by forming a hole near the thicker of the two ends of the dore bar to permit hanging of the bar in an electrolytic solution. In one preferred embodiment, the electrolytic solution includes a 3% Nitric Acid solution. The dore bar is positioned between stainless steel plates formed preferably of a 316 stainless steel in the electrolytic solution. A one to one ratio of anodes to cathodes is preferred. A current in the range of 1 to 4 volts and more preferably less than 3 volts and still more preferably substantially equal to 2.8 volts is passed between the dore bar anode and the stainless steel plate cathode. The electrowinning process continues for anywhere from 30 to 45 hours at a preferred rate of decomposition in the range of 3–5 grams per amp hour. Electrowinning continues until decomposition of the anode bar equals or exceeds 90%. Remaining dore bar nubs and any undissolved oversize pellets are recovered and reprocessed in order to increase ultimate yields.

FIG. 3 also shows the step DIGESTION OF ANODE SLIMES AND PRECIPITATION OF SILVER AND MISCELLANEOUS PLATINUM GROUP ELEMENTS 50. According to one embodiment of the invention, at DIGEST ANODE SLIMES IN $HNO_3$ 30% 51, the anode slimes are digested using a 30% solution of $HNO_3$. At FILTER DIGESTED ANODE SLIMES 52, the digested solution is rinsed and at FILTER LIQUID PRECIPITATE INCLUDING SILVER CONCENTRATIONS 53 the liquid rinse portion containing silver in solution and is washed with HCl and filtered. Solids including silver are recovered and reprocessed for use as inquart material at RECOVER SILVER SOLIDS 54. At RECYCLE LIQUID TO STOCK TANK 100 liquid is disposed of to a palladium stock tank.

FIG. 3 also shows the steps RECOVERY OF GOLD 55, RECOVERY OF RHODIUM 65, RECOVERY OF MISCELLANEOUS PLATINUM GROUP ELEMENTS 75, RECOVERY OF PALLADIUM 80 and RECOVERY OF PLATINUM 90.

Figure 4:
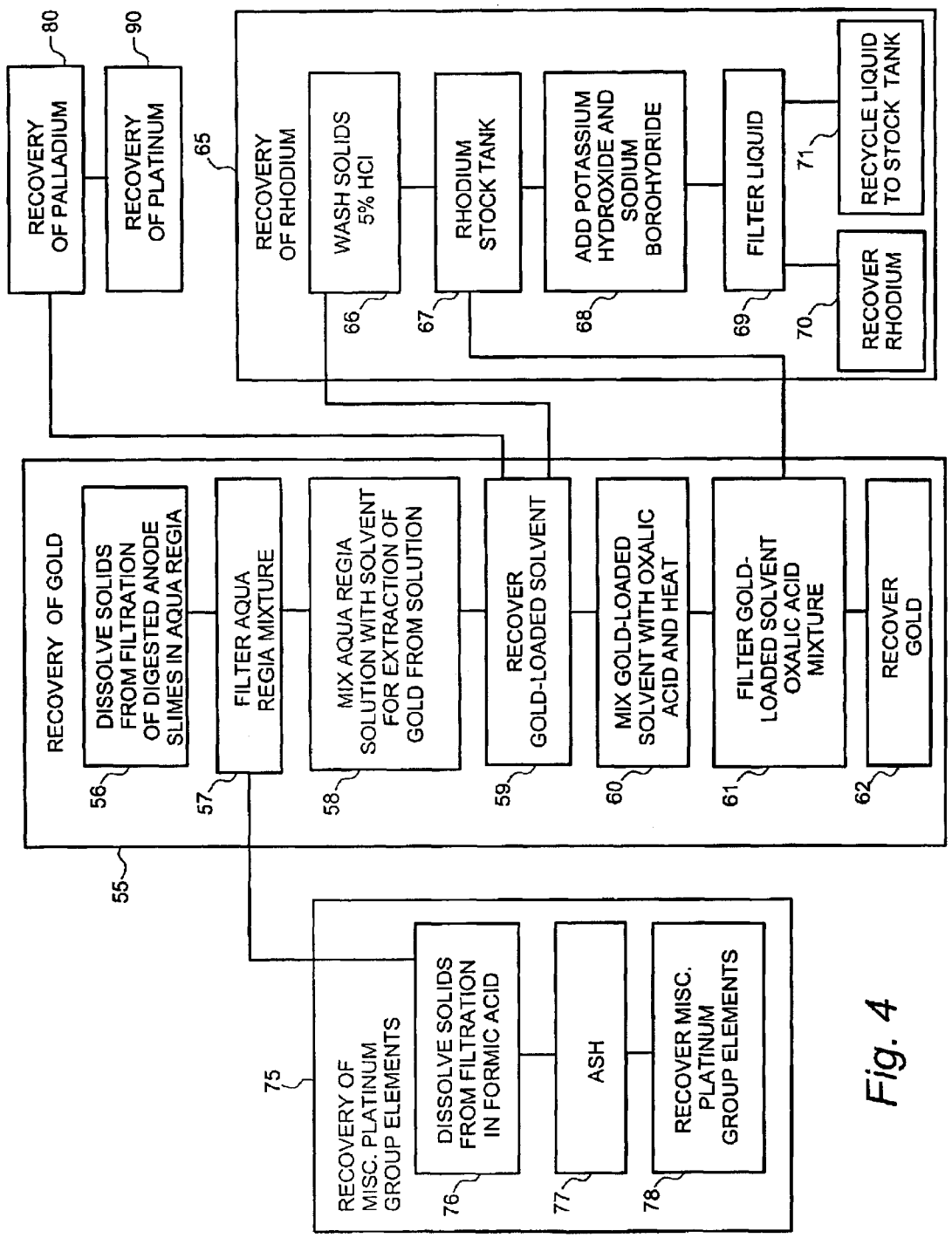
FIG. 4 is a representative flow chart depicting several steps of a method for recovery of one or more trace elements from coal according to one embodiment of the invention.

Referring to FIG. 4, RECOVERY OF GOLD 55 is shown including the steps DISSOLVE SOLIDS FROM FILTRATION OF DIGESTED ANODE SLIMES IN AQUA REGIA 56, FILTER AQUA REGIA MIXTURE 57, MIX AQUA REGIA SOLUTION WITH SOLVENT FOR EXTRACTION OF GOLD FROM SOLUTION 58, RECOVERY GOLD-LOADED SOLVENT 59, MIX GOLD-LOADED SOLVENT WITH OXALIC ACID AND HEAT 60, FILTER GOLD-LOADED SOLVENT OXALIC ACID MIXTURE 61 and RECOVERY OF GOLD 62.

The solids from FILTER DIGESTED ANODE SLIMES 52, shown in FIG. 3, are directed to RECOVERY OF GOLD 55 and more specifically to DISSOLVE SOLIDS FROM FILTRATION OF DIGESTED ANODE SLIMES IN AQUA REGIA 56. At DISSOLVE SOLIDS FROM FILTRATION OF DIGESTED ANODE SLIMES IN AQUA REGIA 56, the residue from the step FILTER DIGESTED ANODE SLIMES 52, is treated with aqua regia, (a mixture of hydrochloric acid, HCl, and nitric acid, $HNO_3$), providing a solution containing gold, platinum and palladium.

At FILTER AQUA REGIA MIXTURE 57, the aqua regia mixture is filtered leaving a residue containing platinum group elements other than platinum and palladium together with silver if present. That residue not dissolved by the initial aqua regia treatment is retreated with aqua regia.

As shown at FIG. 4, at MIX AQUA REGIA SOLUTION WITH SOLVENT FOR EXTRACTION OF GOLD FROM SOLUTION 58, gold is removed from the filtered liquid portion of the aqua regia mixture by solvent extraction with DiButyl Carbitol. While almost any alcohol, ether or ketone which is immiscible with water can be used to extract gold, a preferred extractant is DiButyl Carbitol, which exhibits good selectivity and a relatively high boiling point. DiButyl Carbitol is mixed with the aqua regia solution. In one embodiment of the invention, the extraction of gold is conducted as a continuous counter-current multistage process mixing DiButyl Carbitol with the aqua regia solution. Gold from the aqua regia solution is extracted by this method down to a residual content of less than 2 ppm. The gold-loaded solvent may then be scrubbed with dilute hydrochloric acid to remove base metal impurities and gold.

At MIX GOLD-LOADED SOLVENT WITH OXALIC ACID AND HEAT 60, a reducing agent such as aqueous oxalic acid is added to the gold-loaded solvent and heated to a point in the range of 70 deg. C., (158 deg. F.), to 80 deg. C., (176 deg. F.). The solution produced by treatment with oxalic acid is filtered at, FILTER GOLD-LOADED SOLVENT OXALIC ACID MIXTURE 61 with the residue being ashed to yield gold of purity of at least 99.5% at RECOVERY OF GOLD 62. The liquid formed of the mixture of the gold-loaded solvent and the oxalic acid is recovered and directed to RHODIUM STOCK TANK 67.

At RECOVERY OF MISCELLANEOUS PLATINUM GROUP ELEMENTS 75, the residue or solids of the step FILTER AQUA REGIA MIXTURE 57 are dissolved with formic acid at DISSOLVE SOLIDS FROM FILTRATION IN FORMIC ACID 76, ashed at ASH 77 and at RECOVER MISC. PLATINUM GROUP ELEMENTS 78, the product of the ashing produces miscellaneous platinum group elements other than rhodium, palladium and platinum. Gold and platinum group elements other than rhodium, palladium and platinum are yielded by this process.

FIG. 4 also shows RECOVERY OF RHODIUM 65 to advantage. RECOVERY OF RHODIUM 65 includes WASH SOLIDS 5% HCl 66, where the raffinate remaining following extraction of the gold-loaded solvent at RECOVER GOLD-LOADED SOLVENT 59 is further treated with a hydrochloric acid wash, (5% HCl), with the solution being recovered and conveyed to the stock tank at RHODIUM STOCK TANK 67. At ADD POTASSIUM HYDROXIDE AND SODIUM BOROHYDRIDE 68, Potassium Hydroxide, (KOH) and Sodium Borohydride are combined with the contents of the RHODIUM STOCK TANK 67. Also combined at RHODIUM STOCK TANK 67 is the liquid portion of from FILTER GOLD-LOADED SOLVENT OXALIC ACID MIXTURE 61. At FILTER LIQUID 69, the contents of the treated stock tank are filtered with rhodium being recovered at RECOVER RHODIUM 70 and the liquid portion is recycled at RECYCLE LIQUID TO STOCK TANK 71.

FIG. 4 also shows RECOVERY OF PALLADIUM 80 and RECOVER OF PLATINUM 90, wherein the liquid portion remaining after the gold-loaded solvent is recovered from the mixture of aqua regia with the solvent for extraction of gold from solution is directed for further treatment at RECOVERY OF PALLADIUM 80 and RECOVERY OF PLATINUM 90.

Figure 5:
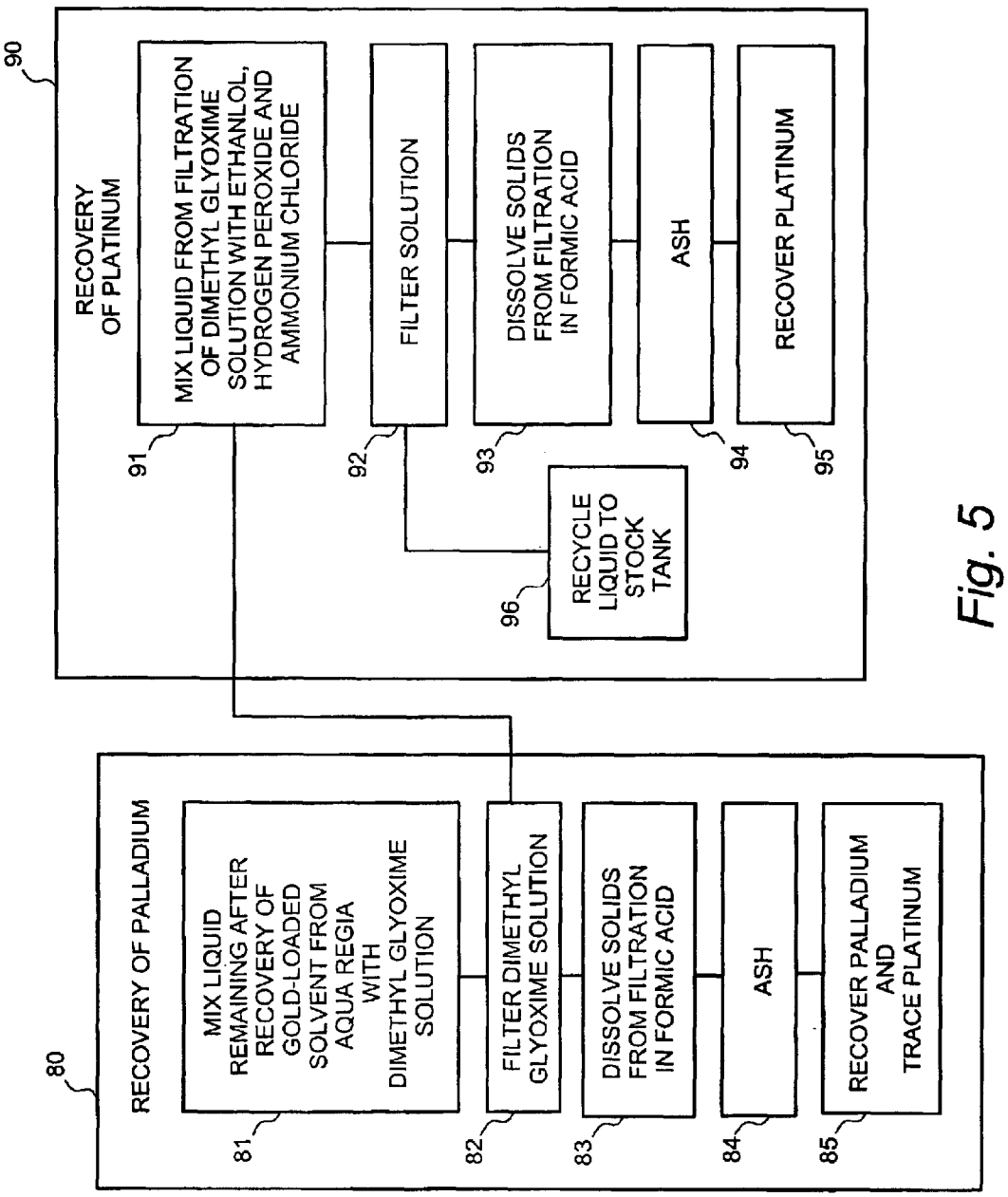
FIG. 5 is a representative flow chart depicting several steps of a method for recovery of one or more trace elements from coal according to one embodiment of the invention.

Referring to FIG. 5, RECOVERY OF PALLADIUM 80 is shown to advantage. At MIX LIQUID REMAINING AFTER RECOVERY OF GOLD-LOADED SOLVENT FROM AQUA REGIA WITH DIMETHYL GLYOXIME SOLUTION 81, Palladium is removed by precipitation with DiMethyl Glyoxime. At FILTER DIMETHYL GLYOXIME SOLUTION 82, the solution is filtered with the residue of the filtration being mixed with formic acid at DISSOLVE SOLIDS FROM FILTRATION IN FORMIC ACID 83. The dissolved solids are ashed at ASH 84 and palladium and trace platinum are recovered at RECOVER PALLADIUM AND TRACE PLATINUM 85.

FIG. 5 also shows RECOVERY OF PLATINUM 90 to advantage. At MIX LIQUID FROM FILTRATION OF DIMETHYL GLYOXIME SOLUTION WITH ETHANOL, HYDROGEN PEROXIDE AND AMMONIUM CHLORIDE 91 the liquid remaining following filtration of the DiMethyl Glyoxime mixture at FILTER DIMETHYL GLYOXIME SOLUTION 82, is mixed with ethanol, hydrogen peroxide and ammonium chloride. At FILTER SOLUTION 92, the solution is filtered and the solids including platinum are recovered. At DISSOLVE SOLIDS FROM FILTRATION IN FORMIC ACID 93 the solids are reduced by dissolving in formic acid. A residue including the dissolved solids are ashed at ASH 94 and platinum is recovered at RECOVER PLATINUM 95.

FIG. 5 also shows RECOVERY OF PLATINUM 90 including RECYCLE LIQUID TO STOCK TANK 96 where the liquids from FILTER SOLUTION 92 are directed to a stock tank for storage and further reprocessing.

EXAMPLE 1

Flyash was produced by the combustion of Blackhawk coal at a temperature in the range of 1,850 deg. C. (3,362 deg. F.) to 1900 deg. C. (3,452 deg. F.). Flyash was removed from the combustion zone when a BTU output of 12,000 BTU/lb was achieved.

The furnace charge was formulated by placing twenty pounds of flyash from the combustion of Blackhawk coal in a rotating hopper type mixer and adding the following inquart materials twenty pounds of 0.9999 silver, 4.37 troy ounces of 0.9999 gold, 2.19 troy ounces of 0.9999 platinum, 4.37 troy ounces of 0.9999 palladium. The following fluxing agents were also added and mixed: 1.00 pounds of flour, 0.50 pounds of niter, 67.00 pounds of borax glass, 34.48 pounds of soda ash, 2.0 pounds of calcium fluoride and 13.22 pounds of silica.

Following mixing, the charge was placed in a induction furnace, in this case manufactured by Induction Technology, Corp. having a 500 lb. crucible. The charge was subjected to a maximum melt temperature range of 2,290 deg. F. to 2,500 deg. F. Total furnace time was 2 hours and 38 minutes. Molten slag and molten metal were discharged from the crucible at a temperature of 2,435 deg. F. Molten slag was discharged to a first mold and molten metal were discharged to a dore bar mold casting a dore bar having a weight substantially equal to 25 pounds. The slag was cooled and recycled by crushing and reheating.

The dore bar was exposed to a 3% nitric acid in an electrowinning cell and wherein the dore bar served as the anode and a sheet of 316 stainless steel served as the cathode. A current in the range of 1 to 4 volts and more preferably less than 3 volts and still more preferably substantially equal to 2.8 volts is passed between the dore bar anode and the stainless steel plate cathode. The electrowinning process continued for 40 hours at a rate of decomposition in the range of 4.025 grams per amp hour. The remaining dore bar nub and 218.2 grams of oversize pellets were recovered for reprocessing in order to increase ultimate yields.

The anode slimes were then digested using a 30% solution of $HNO_3$ The solution was filtered and rinsed with de-ionized water. The solution was filtered and recovered and the liquid is directed to a stock tank for reprocessing in order to increase ultimate yields of palladium. The residue was treated with aqua regia, (3:1), to dissolve gold, platinum, palladium and rhodium. The solution was filtered leaving a residue containing gold, platinum, palladium and rhodium. Residue from the digestion of the filtered anode slimes not dissolved by the initial aqua regia treatment were retreated with aqua regia and refiltered. The residue of the filtration of the aqua regia solution was then ashed yielding silver and platinum group elements other than rhodium, palladium and platinum.

DiButyl Carbitol was added to the aqua regia solution and filtered. The residue of this filtration step was dissolved with hydrochloric acid, (5% HCl), and the solution being recovered and conveyed to a stock tank. Oxalic acid was added to the gold-loaded solvent, and heated to 75 deg. C. The solution produced by treatment with oxalic acid was filtered with the residue ashed to yield gold of purity of 99.5%. The liquid from the filtered oxalic acid solution was recovered and returned to the stock tank containing the solution of hydrochloric acid and the filtered residue of the solution including DiButyl Carbitol. The contents of the stock tank were then treated with Potassium Hydroxide, (KOH) and Sodium Borohydride, ($NaBH_4$), and filtered to produce rhodium.

Palladium and platinum are present in the raffinate remaining after removal of the gold-loaded solvent. The solution which includes palladium and platinum was precipitated out by treatment with DiMethyl Glyoxime. The solids were dried and treated with Formic Acid. The residue was ashed yielding palladium and traces of platinum.

Platinum was removed from the liquid portion reaming after filtration of the solution including DiMethyl Glyoxime by first treating the solution with Ethanol and $H_2O_2$ to neutralize the organic solvent DiMethyl Glyoxime. The solution was then precipitated by addition of $NH_4Cl$. This solution was filtered and the residue burned leaving an impure platinum sponge. The impure platinum sponge was further purified by dissolving in aqua regia and refiltering. The liquid from the filtration was recovered and conveyed to a stock tank.

The method of Example 1 resulted in a net recovery of 20 pounds of silver having a 0.90 purity, a net recovery of 1.05 troy ounces of gold having a 0.90 purity, a net recovery of 3.72 troy ounces of platinum having a 0.90 purity and a net recovery of 6.17 troy ounces of palladium having a 0.90 purity.

EXAMPLE 2

Flyash was produced by the combustion of Powder River coal at a temperature in the range of 1,850 deg. C. (3,362 deg. F.) to 1,900 deg. C. (3,452 deg. F.). Flyash was removed from the combustion zone when a BTU output of 12,500 BTU/lb was achieved.

The furnace charge was formulated by placing twenty pounds of flyash from the combustion of Powder River in a rotating hopper type mixer and adding the following inquart materials 19.3 pounds of 0.9999 silver, 4.37 troy ounces of 0.9999 gold, 2.19 troy ounces of 0.9999 platinum, 4.37 troy ounces of 0.9999 palladium. The following fluxing agents were also added and mixed: 0.50 pounds of flour, 0.250 pounds of niter, 65.00 pounds of borax glass, 30.00 pounds of soda ash, 1.0 pounds of calcium fluoride and 9.00 pounds of silica.

Following mixing, the charge was placed in an induction furnace having a 500 lb. crucible. The charge was subjected to a maximum melt temperature range of 2,000 deg. F. Total furnace time was 2 hours and 38 minutes. Molten slag and molten metal were discharged from the crucible at a temperature of 2,290 deg. F. Molten slag was discharged to a first mold and molten metal were discharged to a dore bar mold casting a dore bar having a weight substantially equal to 25 pounds. The slag was cooled and recycled by crushing and reheating.

The dore bar was exposed to a 3% nitric acid in an electrowinning cell wherein the dore bar served as the anode and a sheet of 316 stainless steel served as the cathode. A current in the range of 1 to 4 volts and more preferably less than 3 volts and still more preferably substantially equal to 2.8 volts is passed between the dore bar anode and the stainless steel plate cathode. The electrowinning process continued for 40 hours at a rate of decomposition in the range of 4.025 grams per amp hour. The remaining dore bar nub and 218.2 grams of oversize pellets were recovered for reprocessing in order to increase ultimate yields.

The anode slimes were then digested using a 30% solution of $HNO_3$. The solution was filtered and rinsed with de-ionized water. The solution was filtered and recovered and the liquid is directed to a stock tank for reprocessing in order to increase ultimate yields of palladium. The residue was treated with aqua regia, (3:1), to dissolve gold, platinum, palladium and rhodium. The solution was filtered leaving a residue containing gold, platinum, palladium and rhodium. Residue from the digestion of the filtered anode slimes not dissolved by the initial aqua regia treatment were retreated with aqua regia and refiltered. The residue of the filtration of the aqua regia solution was then ashed yielding silver and platinum group elements other than rhodium, palladium and platinum.

DiButyl Carbitol was added to the aqua regia solution and filtered. The residue of this filtration step was dissolved with hydrochloric acid, (5% HCl), and the solution being recovered and conveyed to a stock tank. Oxalic acid was added to the gold-loaded solvent, and heated to 75 deg. C. The solution produced by treatment with oxalic acid was filtered with the residue ashed to yield gold of purity of 99.5%. The liquid from the filtered oxalic acid solution was recovered and returned to the stock tank containing the solution of hydrochloric acid and the filtered residue of the solution including DiButyl Carbitol. The contents of the stock tank were then treated with Potassium Hydroxide, (KOH) and Sodium Borohydride, ($NaBH_4$), and filtered to produce rhodium.

Palladium and platinum are present in the raffinate remaining after removal of the gold-loaded solvent. The solution which includes palladium and platinum was precipitated out by treatment with DiMethyl Glyoxime. The solids were dried and treated with Formic Acid. The residue was ashed yielding palladium and traces of platinum.

Platinum was removed from the liquid portion reaming after filtration of the solution including DiMethyl Glyoxime by first treating the solution with Ethanol and $H_2O_2$ to neutralize the organic solvent DiMethyl Glyoxime. The solution was then precipitated by addition of $NH_4Cl$. This solution was filtered and the residue burned leaving an impure platinum sponge. The impure platinum sponge was further purified by dissolving in aqua regia and refiltering. The liquid from the filtration was recovered and conveyed to a stock tank.

The method of Example 2 resulted in a net recovery of 20 pounds of silver having a 0.90 purity, a net recovery of 1.22 troy ounces of gold having a 0.90 purity, a net recovery of 1.00 troy ounces of platinum having a 0.90 purity and a net recovery of 13.04 troy ounces of palladium having a 0.90 purity.

While this invention has been described with reference to the detailed embodiments, this is not meant to be construed in a limiting sense. One or more modifications to the described embodiments as well as the inclusion or exclusion of additional embodiments will be apparent to persons skilled in the art upon reference to this description. It is therefore contemplated that the appended claims will cover any such modifications or embodiments as fall within the true scope of the invention.

What is claimed is:

1. A method for recovering trace elements from coal including the steps of:

mixing a charge including an ash formed by the combustion of a pre-selected coal, the ash including gold and one or more platinum group elements, an inquart including gold and one or more platinum group elements and a fluxing agent;

charging a furnace with the charge;

heating the charge in the furnace to a pre-selected temperature forming a molten charge including a molten inquart;

absorbing a portion of the gold and one or more platinum group elements of the ash into the molten inquart;

discharging a molten slag from the furnace;

casting a dare bar by discharging the molten inquart including an absorbed portion of the gold and one or more platinum group elements of the ash to a mold;

digesting the dore bar in an electrowinning process wherein the dore bar is introduced into an acidic bath as an anode and an electrical potential is maintained between the anode and a metallic plate cathode:

reducing silver ions from the dore bar onto the metallic plate cathode; and precipitating and dissolving trace elements in the electrolytic solution producing an anode slime.

2. The method for recovering trace elements from coal of claim 1 wherein the step of mixing a charge including an ash formed by the combustion of a pre-selected coal further comprises the steps of:

pre-selecting a Blackhawk coal including gold and one or more platinum group elements; and producing an ash from the combustion of the pre-selected Blackhawk coal.

3. The method for recovering trace elements from coal of claim 1 further comprising the steps of:

pre-selecting a Powder River coal including gold and one or more platinum group elements; and producing an ash from the combustion of the pre-selected Powder River coal.

4. The method for recovering trace elements from coal of claim 1 further comprising the steps of:

pre-selecting a Texas lignite including gold and one or more platinum group elements; and producing an ash from the combustion of the pre-selected Texas lignite.

5. The method for recovering trace elements from coal of claim 1 wherein the step of mixing a charge including an ash further comprises mixing a charge including a flyash produced by the combustion of a pre-selected coal, the flyash including gold and one or more platinum group elements.

6. The method for recovering trace elements from coal of claim 1 wherein the step of mixing a charge for a furnace further comprises mixing an inquart including silver, gold, platinum and palladium.

7. The method for recovering trace elements from coal of claim 1 wherein the step of mixing a charge for a furnace further comprises mixing a charge including borax glass, soda ash, silica, fluorspar, flour and niter.

8. The method for recovering trace elements from coal of claim 1 wherein the step of mixing a charge including an ash further comprises mixing a charge including an ash having a total concentration of gold and platinum group elements greater than 0 ppm and a bromine concentration of less than or equal to 1.00 ppm.

9. The method for recovering trace elements from coal of claim 8 wherein the step of mixing a charge including an ash further comprises mixing a charge including an ash having a concentration of chlorine less than or equal to 150 ppm.

10. The method for recovering trace elements from coal of claim 8 wherein the step of mixing a charge including an ash further comprises mixing a charge including an ash having a concentration of aluminum less than or equal to 32,000 ppm.

11. The method for recovering trace elements from coal of claim 8 wherein the step of mixing a charge including an ash further comprises mixing a charge including an ash having a concentration of chromium less than or equal to 30 ppm.

12. The method for recovering trace elements from coal of claim 8 wherein the step of mixing a charge including an ash further comprises mixing a charge including an ash having a concentration of iron less than or equal to 11,000 ppm.

13. The method for recovering trace elements from coal of claim 8 wherein the step of mixing a charge including an ash further comprises mixing a charge including an ash having a concentration of cobalt less than or equal to 11 ppm.

14. The method for recovering trace elements from coal of claim 8 wherein the step of mixing a charge including an ash further comprises mixing a charge including an ash having a concentration of nickel less than or equal to 40 ppm.

15. The method for recovering trace elements from coal of claim 8 wherein the step of mixing a charge including an ash further comprises mixing a charge including an ash having a concentration of molybdenum less than or equal to 4.5 ppm.

16. The method for recovering trace elements from ash of claim 1 wherein the step of mixing a charge including an ash further comprises mixing a charge including a flyash including:
- a total concentration of gold and platinum group elements greater than 0 ppm;
- a concentration of bromine less than or equal to 1.00 ppm;
- a concentration of chlorine less than or equal to 150 ppm;
- a concentration of aluminum less than or equal to 32,000 ppm;
- a concentration of chromium less than or equal to 30 ppm;
- a concentration of iron less than or equal to 11,000 ppm;
- a concentration of cobalt less than or equal to 9 ppm;
- a concentration of nickel less than or equal to 40 ppm; and
- a concentration of molybdenum less than or equal to 4.5 ppm.

17. The method for recovering trace elements from coal of claim 1 including the additional steps of:

digesting the anode shines in an acid;

filtering the digested anode slimes precipitating a compound including silver from the digested anode slimes and producing a residue containing gold platinum and palladium;

dissolving the residue in an aqua regia solution;

mixing the aqua regia solution with a solvent;

recovering a gold-loaded solvent from a mixture of the aqua regia solution and the solvent;

reducing the gold-loaded solvent with a reducing agent; and filtering a reduced gold-loaded solvent producing a residue including gold.

18. The method for recovering trace elements from coal of claim 17 including the additional steps of:

precipitating palladium out of the aqua regia solution;

filtering a precipitated palladium solution producing a residue including palladium and a liquid including platinum;

reducing the residue including palladium with a reducing agent; and ashing a reduced residue including palladium to yield palladium.

19. The method for recovering trace elements from coal of claim 18 including the additional steps of:

treating a liquid extracted from the precipitated palladium solution filtration with ethanol, hydrogen peroxide and ammonium chloride;

filtering a treated precipitated palladium solution producing a residue including platinum;

reducing the residue including palladium with a reducing agent; and ashing a reduced residue including platinum to yield platinum.

20. The method for recovering trace elements from coal of claim 2 wherein the step of producing an ash from the combustion of the pre-selected Blackhawk coal further comprises combusting the pre-selected Blackhawk coal at a pre-selected temperature producing an ash including gold and one or more platinum group elements.

21. The method for recovering trace elements from coal of claim 3 wherein the step of producing an ash from the combustion of the pre-selected Powder River coal further comprises combusting the pre-selected Powder River coal at a pre-selected temperature producing an ash including gold and one or more platinum group elements.

22. The method for recovering trace elements from coal of claim 4 wherein the step of producing an ash from the combustion of the pre-selected Texas lignite further comprises combusting the pre-selected Texas lignite at a pre-selected temperature producing an ash including gold and one or more platinum group elements.

* * * * *